May 20, 1924.
E. D. TILLYER
LENS MEASURE
Filed April 10, 1922
1,494,648
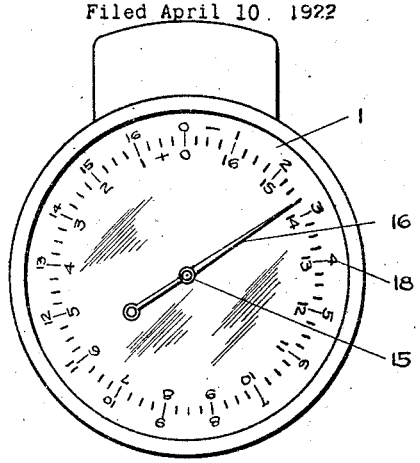
FIG. I
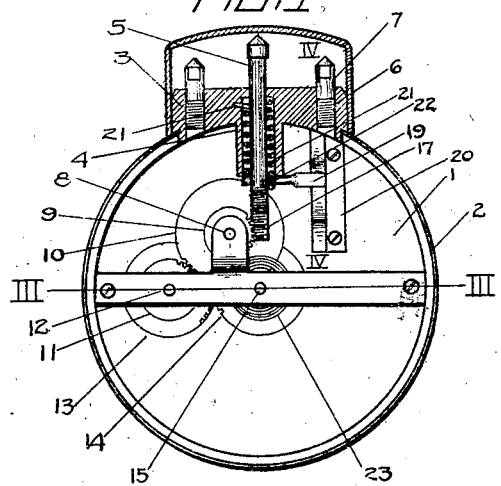
FIG. II
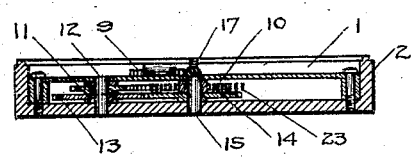
FIG. III
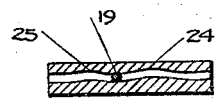
FIG. IV
INVENTOR
EDGAR D. TILLYER
BY
H. H. Styll   A. H. Parsons
ATTORNEYS Patented May 20, 1924.

1,494,648

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS MEASURE.

Application filed April 10, 1922. Serial No. 551,082.

*To all whom it may concern:*

Be it known that I, EDGAR D. TILLYER, a citizen of the United States, residing at Southbridge, in the county of Worcester and State of Massachusetts, have invented certain new and useful Improvements in Lens Measures, of which the following is a specification.

This invention relates to new and useful improvements in lens measures and more particularly to an instrument for measuring the curvature of spherical and cylindrical lenses and wherein suitable means is provided to display these measurements.

As a general rule the lens measures of that type which are provided with a graduated dial, a movable pointer and various types of mechanism for operating said pointer which include in their construction, gears, pinions and mechanical parts of this character, have transmitted thru the co-operative movable parts errors which are not only transmitted thru the co-operative system but in addition thereto they are frequently multiplied to considerable extent.

The main object of my invention is the provision of a lens measure having means embodied therein which will correct or eliminate various errors and difficulties in the operating system of a lens measure.

A further object of the invention is the provision of a lens measure wherein means is provided to co-operate with the operating mechanism whereby to impart to the indicator an equal arc of movement for each diopter or fraction of diopter when used in measuring positive or negative surfaces.

With the above and other objects in view the invention consists in the novel features of construction, the combination and arrangements of parts hereinafter more fully set forth, pointed out in the claims and shown in the accompanying drawings in which—

Figure I is a plan view of a lens measure constructed in accordance with my invention.

Figure II is a similar view with the graduated dial removed.

Figure III is a transverse section taken on the lines 3—3 of Figure II.

Figure IV is a transverse section taken on the lines 4—4 of Figure II.

Referring now more particularly to the drawings the numeral 1 indicates the casing in which the operating parts of my improved lens measure are arranged, said casing being preferably provided with a fairly thick outer wall 2 whereby to insure proper protection for the mechanism upon the interior of the casing.

One side of the casing is cut away and arranged within this cut away portion is the point block 3 having a central opening 4 thru which the movable pin 5 is extended while the block is further provided upon opposite sides of the opening 4, with screw threaded bores 6 into which are fitted the stationary point members 7. As illustrated in Figure II the terminals of the point members 7 are preferably disposed on a horizontal line while the outer end of the movable point 5 projects beyond the line of the points 7.

Mounted within the base of the case 1 is an eccentric shaft 8 upon the upper end of which is mounted a pinion 9 and mounted upon the shaft 8 beneath the pinion 9 is a gear 10. The gear 10 as illustrated in Figure II is of a suitable size sufficient to engage the pinion 11 mounted upon the shaft 12 arranged at one side of the casing. Upon the shaft 12 beneath the pinion 11 is a gear 13 adapted to mesh with a gear 14 mounted upon the shaft 15. This shaft is preferably arranged concentric with the wall 2 and carrying upon its upper end a pointer 16.

The inner end of the movable pin 5 is provided with the screw threads 17 adapted to co-operate with the teeth on the pinion 9 whereby upon reciprocating movement of the member 5 rotary movement will be imparted to the shaft 8 and the various mechanical parts which connect this shaft with the shaft 15, whereby it will be apparent that upon reciprocating movement of the member 5 the indicator 16 will be moved over the graduated face of the dial 18.

As a general rule the movable pin 5 is provided with angular grooves and ridges for engagement with a pinion similar to the pinion 9 shown in the drawings, but in this particular style of mounting and operation of the indicator 15 various errors occur in the operating parts of the measure. My improvement is to impart to the indicator an equal arc of movement for each diopter or fraction of diopter whether used in measuring positive or negative surfaces. It will, therefore, readily be seen that I have provided the pin 5 at its lower end with the screw threads 17 instead of the usual rack bar, in view of the fact that it is possible for me to make whatever minute adjustments I desire, which adjustments cannot possibly be made with a rack bar. In other words, the pin 5 may be rotated very slightly if desired to compensate for any inaccuracies of the gearing mechanism associated therewith. In order to carry this out an arm 19 is attached to the movable pin 5 in any suitable manner and extends at right angles to the same, the outer end of said arm being adapted to ride upon the templet or cam 20 which is arranged parallel with the pin 5.

The cam 20 may be formed of any suitable material which can be readily reshaped, the particular purpose of this cam being to correct the difficulties in the operative mechanism which controls the indicator 16. This correction can be made by testing several lenses with regard to their positive and negative surfaces and then bending or shaping the cam 20 in accordance with the errors which occur in the system or operating mechanism.

In order that the arm 19 will be retained in contact with the cam 20 at all times a coil spring 21 is mounted upon the pin 5, one end of this spring being connected to the block 3 and the other end of this spring contacting with the arm 19 as at 22. From this it will be apparent that the arm 19 will be retained in contact with the cam 20 at all times. Furthermore the spring 21 will tend to assist the spring 23 in returning the pin to its normal position shown in Figure I.

The spring 23 has one end connected with the shaft 15 and the other end connected to any suitable stationary object whereby when the pin 5 is pressed inwardly and the pinion 9 rotated, the shaft 15 will be rotated placing the spring 23 under tension so that upon release of the pin 5 the tension of the spring 23 will rotate this shaft 15 returning the pin 5 to its normal position.

In Figure IV I have illustrated a slightly modified form of cam or templet, which is in the form of a block 24 having a longitudinal groove 25 formed in one face thereof, said groove forming a guide for the end of the arm 19. The curvature and pathway defined by the groove will be sufficient to correct the errors which occur in the operative system of the measure. These various curves are arranged in accordance with the errors that occur in the operative system.

I wish also to call attention to the outer ends of the pin 5 and the members 7, in Figure II the points 5 and 7 are illustrated as of particular pointed design, or if found desirable rounded ends may be used, these being known as ball points. It will thus be seen that the cam and arm will give a slight rotary motion to the pin 5 to compensate for the inaccuracies and mis-adjustments above referred to. Such a construction is exceptionally desirable and, of course, it will be seen that the screw threads 17 will permit of the proper functioning of the parts 19 and 20. In other words, the pin 5 will always have a slight rotary motion as well as a reciprocatory motion when the lens measure is in use.

I wish to call particular attention to the measuring dial 18 wherein the positive and negative measurements are arranged equally whether of a positive or a negative nature. Heretofore dials of this character have been made with the positive and negative measurements unequal with respect to each other which makes it somewhat difficult to read or measure positive and negative surfaces of a lens. It will be apparent from the foregoing description taken in connection with the accompanying drawings that the longitudinal movement of the pin 5 combined with its rotative action which is caused by the corrective cam or templet 20 gives the indicator 16 an equal arc of movement for each diopter or fraction of diopter whether used in measuring positive or negative surfaces.

What I claim is,

1. A lens measure including a case, an indicator carried by the case, a reciprocable pin, operative connection between the pin and indicator and means for imparting an oscillatory movement to the indicator in addition to that caused by the reciprocation of the pin.

2. A lens measure including a case, an indicator carried by the case, a reciprocable pin, operative connection between the pin and indicator and means for imparting a variable oscillatory movement to the indicator in addition to that caused by the reciprocation of the pin.

3. A lens measure including a case, an indicator carried thereby, a reciprocable pin having an operative connection with the indicator and means to co-operate with the pin to impart rotative action thereto upon reciprocating movement of said pin to give the indicator an equal arc of movement for each diopter or fraction of diopter in measuring either positive or negative lenses.

4. A lens measure including a case, an indicator carried by the case, a reciprocable pin, operative connection between the pin and indicator, a corrective cam within the case and means carried by the pin and engaging the cam for imparting an oscillatory movement to the indicator in addition to that caused by the reciprocation of the pin.

5. A lens measure including a case, an indicator carried by the case, a reciprocable pin, operative connection between the pin and indicator, a corrective cam carried by the case, an arm carried by the pin having one end movable over the face of said cam whereby to impart an oscillatory movement to the indicator, as and for the purpose set forth.

6. A lens measure including a case, an indicator carried by the case, a reciprocable pin, operative connection between the pin and indicator, a corrective cam carried by the case, an arm carried by the pin having one end engaging the face of the cam and means whereby to normally retain the arm in engagement with the cam and imparting an oscillatory movement to the indicator in addition to that caused by the reciprocation of the pin.

7. A lens measure including a case, an indicator carried by the case, a reciprocable pin, operative connection between the pin and indicator, an arm carried by the pin and a corrective guide carried by the case for engagement by the arm whereby to impart a variable oscillatory movement to the indicator in addition to that caused by the reciprocation of the pin.

8. A lens measure including a reciprocable pin, a screw thread rack thereon, a gear meshing with the rack, a lever secured to the pin and a cam engaging the lever whereby inaccuracy in the gear teeth is compensated for by the oscillation of the pin through the action of the lever and the cam.

EDGAR D. TILLYER.